Patented Feb. 8, 1944

2,341,266

UNITED STATES PATENT OFFICE 2,341,266

CONDENSATION PRODUCT OF A UREA, AN ALIPHATIC ALDEHYDE, AND AN AMINO SALT

Gaetano F. D'Alelio, Pittsfield, Mass., assignor to General Electric Company, a corporation of New York No Drawing. Application August 9, 1939, Serial No. 289,279

20 Claims. (Cl. 260—70)

This invention relates to new condensation products and to methods of making the same. The invention is concerned more particularly with self-curing aminoplasts by which are meant heat-convertible resinous condensation products prepared from amino or amido compounds and having the inherent characteristic of curing under heat or under heat and pressure to the insoluble, infusible state without the addition of a curing accelerator or catalyst.

In the production of aminoplasts it has been common practice in converting such materials to the insoluble, infusible state to incorporate into the condensation product or into the molding composition a latent or active (direct) curing catalyst. As pointed out more particularly hereafter, this technique and the final products have not been wholly satisfactory.

I have discovered that self-curing aminoplasts can be produced by condensing ingredients comprising (1) a urea, (2) an aliphatic aldehyde, for example formaldehyde, and (3) aminoamide salts or aminonitrile salts, more particularly an aldehyde-reactable salt selected from the class consisting of addition salts of an acid and an amino compound selected from the following: (a) monomeric amino aliphatic carboxylic amides wherein each and every carbon atom connected to the nitrogen atom of the amino group other than the amino group of the amide radical (carbamyl radical) always has at least one hydrogen atom attached thereto, (b) monomeric amino aromatic carboxylic amides, (c) monomeric amino sulfonamides and (d) monomeric amino nitriles, the said amino group in the compounds of (a), (b), (c) and (d) in all cases having at least one hydrogen atom attached to the nitrogen atom thereof. The initial condensation may be carried out at normal or at elevated temperatures, in the presence or absence of a condensation catalyst as more fully described hereinafter.

The aminoamide salts used in practicing this invention are those inorganic and organic salts of aminoamides in which at least one hydrogen is attached to the amido nitrogen. As a result they are aldehyde-reactable and for purposes of brevity are so termed hereafter and in the appended claims. An example of an aminoamide salt is aminoacetamide hydrochloride,

$HCl \cdot NH_2CH_2CONH_2$.

In many chemical reactions, organic compounds containing nitrile radicals have a function identical with, or closely allied with, compounds containing amide radicals. In this invention the aminoamide salts are equivalent to the aminonitrile salts. The term "amino salt" as used hereafter for purpose of brevity therefore is intended to include within its meaning both aminoamide and aminonitrile salts. An example of an aminonitrile salt is aminoacetonitrile hydrochloride, $HCl \cdot NH_2CH_2CN$.

The urea component (aldehyde-reactable organic compound of the urea system) may be, for instance, urea ($NH_2CONH_2$) itself; thiourea; iminourea (guanidine); aldehyde-reactable substituted ureas, thioureas, and iminoureas such as methyl urea, acetyl urea, benzoyl urea, phenyl thiourea, asymmetrical diethyl urea, allyl urea, 2-chloroallyl urea, ethylidene urea, methylol urea, methylene urea, dicyandiamide (cyanoiminourea), guanylurea, guanylthiourea, biguanide, aminoguanidine, creatine (guanidine methyl glycine) and guanoline (guanido carbonic ethyl ester). Terms such as "a urea," "urea component" and "urea substance," as used generally herein and in the appended claims, are intended to include within their meaning substances of the kind above mentioned. Instead of a urea, other amidogen compounds may be employed such, for example, as aldehyde-reactable aminotriazoles, aldehyde-reactable triazine derivatives, creatinine (anhydride of creatine), ethylene pseudosulfocarbamide derivatives and sulfohydantoin (pseudothioglycolylurea).

In producing the new condensation products, which may be described more specifically as co-condensation products, the choice of the aliphatic aldehyde component is dependent largely upon economic considerations and upon the particular properties desired in the finished product. I prefer to use as the aldehydic component formaldehyde or compounds engendering formaldehyde such as paraformaldehyde, hexamethylene tetramine, etc. For some applications I may use for instance, acetaldehyde, propionaldehyde, butyraldehyde, acrolein, methacrolein, crotonaldehyde. etc., mixtures thereof, or mixtures of formaldehyde (or compounds engendering formaldehyde) with such aliphatic aldehydes. In general the longer the chain of the aliphatic aldehyde, the slower the cure of the resinous condensation product and the softer is the final product.

In the heat-convertible resinous condensation products of this invention the self-curing property of the product is imparted thereto by creating a resin molecule having this inherent characteristic. This is a discovery of great practical significance. It makes possible the production of molding compositions of uniform curing characteristics, which compositions yield molded articles free from imperfections, such as blisters, discolorations, etc. Such imperfections are due usually to localized curing that often occurs in resinous materials of the admixed-catalyst type. As the value of the molded article, especially light-colored articles, is materially influenced by its appearance, it is clear that the discovery of any means for decreasing or eliminating entirely the production of imperfect articles which must be scrapped or sold at reduced price is of considerable commercial importance.

As a result of my invention the difficulties attendant the production of molding compositions comprising aminoplasts of the admixed-catalyst type are avoided. With such compositions there was, despite the most careful precautions, considerable variation in the curing rates of the individual batches. This made difficult the maintenance of production schedules. Considerable variation also was common even among different portions of the same batch of material, as evidenced by the appearance of the cured article.

The resin syrups and molding compositions of this invention may be stored for long periods of time without material alteration. In marked contrast therewith the prior heat-convertible aminoplasts, more particularly those containing direct or active curing catalysts such as acids, for example hydrochloric, ethyl sulfuric, phthalic, chloroacetic, phosphoric, etc., lacked time or storage stability. This necessitated early use of the material after incorporating the catalyst.

Further, the molding compositions of this invention cure rapidly under heat or under heat and pressure and have good plastic flow during molding. Hence molded articles of even the most complicated designs can be produced rapidly and economically. The cured products have good light stability, excellent water resistance and surface finish and, in general, meet the strength, hardness and other requirements of the particular service application.

In carrying the present invention into effect the condensation reaction between the aliphatic aldehyde and the other components preferably is started under neutral or alkaline conditions. Neutral conditions may be established by neutralizing (if necessary) either the mixed components or the individual component or components prior to admixture. Any substance yielding an alkaline aqueous solution may be used in obtaining alakline conditions for the initial condensation reaction. In some cases it may be desirable, in order more quickly to initiate reaction between the starting materials, to add a small amount of a suitable organic or inorganic acid. Thereafter the solution is treated to eliminate acidic conditions due to acid or acid salts. That is, the mass is neutralized or is made alkaline by adding an alkaline substance. The reaction is then caused to proceed further to produce the self-curing aminoplasts of this invention.

In obtaining the neutral, alkaline or acid conditions above described I may use, for example, ammonia, sodium hydroxide or carbonate, calcium hydroxide, methyl amine, diethyl amine, tri-isopropyl amine, ethanol amines, tri-isopropanol amine, etc., mixtures of such alkaline substances, inorganic or organic acids such as hydrochloric, sulfuric, phosphoric, acetic, acrylic, crotonic, malonic, etc., or acid salts such as sodium acid sulfate, monosodium phosphate, monosodium phthalate, etc., or mixtures of acids, of acid salts, or of acids and acid salts.

Various ways may be employed for effecting initial reaction between the components. For example, I may first mix all the reactants and effect condensation between the mixed reactants in the presence or absence of addition agents, as for instance, condensation catalysts, fillers, plasticizers, other natural or synthetic resinous bodies, solvents or diluents, etc. Alternatively, I may add the amino salt to a partial condensation product of a urea and an aliphatic aldehyde and effect further condensation between the components. Or, I may first condense the amino salt with aliphatic aldehyde, add the resulting product to a urea-aliphatic aldehyde partial condensation product and then cause the reaction to proceed further. Or, I may condense or partially condense the amino salt with a molecular excess of an aliphatic aldehyde, add a urea to this condensation product and effect further reaction between the components. Still other ways may be employed in combining the components and in producing the unmodified and modified condensation products of this invention, as will be readily understood by those skilled in the art as the description of the invention proceeds. These condensation reactions may proceed under a wide variety of time, temperature and pressure conditions. The temperature of reaction may vary from room temperature to the reflux temperature of the reactants at reduced, atmospheric or super-atmospheric pressures.

The products obtained as described above properly may be designated as intermediate condensation products. They are heat-convertible resinous bodies which alone or mixed with fillers, pigments, dyes, lubricants, plasticizers, etc., may be used, for example, as molding compositions. The modified and unmodified resinous masses are self-convertible under heat or under heat and pressure to the insoluble infusible state.

Depending upon the particular reactants employed and the particular conditions of reaction, these intermediate condensation products vary from clear, colorless, syrupy, water-soluble liquids to viscous, milky dispersions and gel-like masses of decreased solubility in ordinary solvents, such as alcohol, glycol, glycerine, water, etc. These liquid intermediate condensation products may be concentrated or diluted further by the removal or addition of volatile solvents to form liquid coating compositions of adjusted viscosity and concentration. The liquid compositions may be used, for instance, as surface-coating materials, in the production of paints, varnishes, lacquers, enamels, etc., for general adhesive applications. as anti-creasing agents, in producing laminated articles, and for numerous other purposes. The liquid intermediate condensation products also may be used directly as casting resins. Those intermediate products of a gel-like nature may be dried and granulated to form clear, unfilled, heat-convertible resins.

In order that those skilled in the art better may understand how this invention may be carried into effect, the following examples are given by way of illustration. All parts are by weight.

Example 1

| | Parts |
|---|---|
| Urea | 60 |
| Aqueous ammonia (28%) | 10 |
| Aqueous formaldehyde-technical (37.1%) | 161 |
| Aminoacetamide hydrochloride | 1 |

The above components were mixed and heated under reflux for 4 minutes. The resulting clear hot resin syrup was compounded with 70 parts alpha flock and 0.4 part zinc stearate to form a molding composition. The molding compound was dried at 50° C. for about 5 hours. Molded articles were prepared by molding the compound at 130° C. and 2000 pounds per square inch pressure for 4 minutes. The molded pieces were well cured, had good color and other desirable characteristics.

Example 2

| | Parts |
|---|---|
| Urea | 60.0 |
| Aqueous formaldehyde-technical (37.1%) | 161.0 |
| Sodium hydroxide in 10 parts water | 0.04 |
| Aminoacetamide hydrochloride | 1.0 |

The above components were mixed and heated under reflux for 5 minutes. The hot syrup was compounded with 70 parts alpha flock and 0.4 part zinc stearate to form a molding composition. The compound was dried at 50° C. for 5½ hours and molded at 130° C. under a pressure of 2000 pounds per square inch for 4 minutes. The molded articles were well-cured and possessed other desirable characteristics such as good color and uniformity of composition.

Example 3

| | Parts |
|---|---|
| Urea | 60.0 |
| Aqueous ammonia (28%) | 7.5 |
| Aqueous formaldehyde-technical (37.1%) | 160.0 |
| Sodium hydroxide in 1 part of water | 0.04 |
| Aminoacetamide hydrochloride | 1.0 |

All of the above components with the exception of the aminoacetamide hydrochloride were mixed and heated under reflux for 30 minutes. To the non-curing product of partial condensation was added the above stated amount of aminoacetamide hydrochloride. The syrup was mixed with 70 parts alpha flock and 0.4 part zinc stearate. The molding composition was heated at 50° C. for 5 to 6 hours to effect drying simultaneously with further condensation, thereafter being molded under pressure at 130° C. Molded articles were obtained which were well cured and possessed other desirable characteristics.

Example 4

| | Parts |
|---|---|
| Urea | 60.0 |
| Hexamethylenetetramine | 17.5 |
| Aqueous formaldehyde-technical (37.1%) | 150.0 |
| Aminoacetamide hydrochloride | 1.0 |

All of the above components with the exception of the aldehyde-reactable monoaminoamide salt were mixed and heated under reflux for 30 minutes. To the resulting non-curing resin syrup was added the above stated amount of aminoacetamide hydrochloride, 70 parts alpha flock and 0.4 part zinc stearate. The molding compound was dried at 50° C. for about 6 hours and molded at 130° C. for 4 minutes under a pressure of 2000 pounds per square inch. The molded articles had very good color and were well cured.

Example 5

| | Parts |
|---|---|
| Urea | 60.0 |
| Aqueous amomnia (28%) | 7.5 |
| Aqueous formaldehyde-technical (37.1%) | 160.0 |
| Sodium hydroxide in 1 part of water | 0.04 |
| Aminoacetonitrile hydrochloride | 1.0 |

The above components with the exception of the aldehyde-reactable aminonitrile inorganic salt were mixed and heated under reflux for 30 minutes. The resulting hot non-curing syrup was mixed with 70 parts alpha flock and 0.4 part zinc stearate. The mixture was dried at 50° C. and 1 part aminoacetonitrile hydrochloride in an alcoholic solution was added and thoroughly mixed into the mass. The mixture was further heated at 50° C. to effect drying simultaneously with further condensation. The compound was hardened under pressure at 110° C. for 2½ to 3 minutes to form well-cured molded articles.

Example 6

Same formulation and procedure as in Example 5 except that 1 part of an aldehyde-reactable aminoacetamide inorganic salt, specifically aminoacetamide hydrochloride, was used instead of the aminoacetonitrile hydrochloride. The compound was molded 4 minutes at 130° C. under a pressure of 2000 pounds per square inch. The molded pieces were well cured and had other desirable characteristics.

Example 7

| | Parts |
|---|---|
| Urea | 60.0 |
| Aqueous formaldehyde-neutral (37.1%) | 161.0 |
| Aminoacetamide hydrochloride | 0.5 |

The above components were mixed and heated under reflux for 10 minutes. The syrup was mixed with 70 parts alpha flock and 0.4 part zinc stearate to form a molding composition. The compound was dried at 50° C. and molded at 130° C. for 4 minutes under 2000 pounds per square inch pressure. The molded pieces were well cured and had good color.

Condensation products of urea and formaldehyde alone, prepared as described in, for instance, Examples 1, 2, 3, 5 and 6, but not intercondensed with the specific amino salt mentioned in the individual example, are heat-non-convertible. In other words, they will not cure under heat or under heat and pressure to the insoluble infusible state.

It will be understood, of course, that the specific aldehyde-reactable amino salts mentioned in the above examples are only by way of illustration and that any other aldehyde-reactable aminoamide salt and any other aldehyde-reactable aminonitrile salt may be used in carrying this invention into effect. Additional examples of such amino-amide salts are:

$NH_2CH_2CONH_2 \cdot HCl$
Aminoacetamide hydrochloride $NH_2CH_2CONH_2 \cdot HBr$
Aminoacetamide hydrobromide $NH_2CH_2CONH_2 \cdot HF$
Aminoacetamide hydrofluoride $NH_2CH_2CONH_2 \cdot HI$
Aminoacetamide hydroiodide $NH_2CH_2CONH_2 \cdot \frac{1}{2}H_2SO_4$
Aminoacetamide sulfate $NH_2CH_2CONH_2 \cdot \frac{1}{3}H_3PO_4$
Aminoacetamide phosphate $NH_2CH_2CONH_2 \cdot HNO_3$
Aminoacetamide nitrate $NH_2CH_2CONH_2 \cdot CH_3COOH$
Aminoacetamide acetate $NH_2CH_2CONH_2 \cdot C_2H_5COOH$
Aminoacetamide propionate $CH_3CHNH_2CONH_2 \cdot C_3H_7COOH$
Alanine amide butyrate $CH_3CHNH_2CONH_2 \cdot C_4H_9COOH$
Alanine amide valerate $CH_3CH_2CHNH_2CONH_2 \cdot CH_2=CHCOOH$
Alpha aminobutyramide acrylate $CH_3CHNH_2CH_2CONH_2 \cdot CH_2=C(CH_3)COOH$
Beta aminobutyramide methacrylate $(CH_2NH_2CH_2CONH_2)_2 \cdot (COOH)_2$
Beta aminopropionamide oxalate $(CH_3CHNH_2CONH_2)_2 \cdot CH_2(COOH)_2$
Alanine amide malonate $[(NH_2CH(CONH_2))_2]_2 \cdot (CH_2CH_2COOH)_2$
Aminomalonamide adipate $CH_3NHCH_2CONH_2 \cdot CH_3CHOHCOOH$
Methylaminoacetamide lactate $(CH_3NHCH_2CONHCH_3)_3 \cdot HO-C(CH_2COOH)_2-COOH$
Methylamino N-methylacetamide citrate $p\text{-}NH_2C_6H_4SO_2NH_2 \cdot HCl$
Para aminobenzenesulfonamide hydrochloride $\left(\begin{array}{c}NH_2-CHCONH_2\\ |\\ CH_2CONH_2\end{array}\right)_2 \cdot \begin{array}{c}CH-COOH\\ \|\\ CH-COOH\end{array}$
Aspartic amide maleate $C_2H_5NHCH_2CONHC_2H_5 \cdot C_6H_5COOH$
Ethylamino, N-ethyl acetamide benzoate $NH_2CH_2CONHC_6H_5 \cdot HOC_6H_4COOH$
Aminoacetanilide salicylate In preparing the amino amide salts from the amino-amide and an acid, I may use such acids as hydrochloric, hydrobromic, hydriodic, hydrofluoric, nitric, sulfuric, phosphoric, boric, selenic, chromic, acetic, propionic, butyric, valeric, caproic, acrylic, methacrylic, oxalic, malonic, succinic, glutaric, adipic, lactic, citric, tartaric, malic, maleic, fumaric, itaconic, citraconic, propane tricarboxylic, benzoic, phthalic, salicylic, sulfonic, toluene sulfonic, etc.

Illustrative of the aminoamides which may be employed in the preparation of aminoamide salts are glycine amide, alanine amide, valine amide, leucine amide, isoleucine amide, caprine amide, ornithine amide, lysine amide, arginine amide, aspartic amide, glutamic amide, serine amide, beta hydroxy glutamic amide, cysteine amide, cystine amide, phenyl alanine amide, tyrosine amide, proline amide, oxyproline amide, histidine amide, tryptophane amide, or the monosubstituted N-alkyl, N-aryl, or N-acyl derivatives of the above, as well as the aminobenzoic amides and the aminosulfonamides.

Illustrative of the aminonitriles which may be used in the preparation of their salts with any of the above acids are:

$NH_2CH_2CN$
Aminoacetonitrile $CH_3CHNH_2CN$
Alpha aminopropionitrile $CH_2NH_2CH_2CN$
Beta aminopropionitrile $CH_3CH_2CHNH_2CN$
Alpha aminobutyronitrile $CH_3CHNH_2CH_2CN$
Beta aminobutyronitrile $NH_2CH_2CH_2CH_2CN$
Gamma aminobutyronitrile $CH_3CH_2CH_2CH_2CHNH_2CN$
Alpha aminocapronitrile $NH_2CH_2CH_2CH_2CHNH_2CN$
Alpha delta diaminovaleronitrile $NH_2CH_2CH_2CH_2CH_2CHNH_2CN$
Alpha epsilon diaminocapronitrile $NC-CH_2CHNH_2CN$
Alpha aminosuccinonitrile $NCCH_2CH_2CHNH_2CN$
Alpha aminoglutaronitrile $o\text{-}NH_2C_6H_4CN$
Ortho aminobenzonitrile $m\text{-}NH_2C_6H_4CN$
Meta aminobenzonitrile $p\text{-}NH_2C_6H_4CN$
Para aminobenzonitrile Where a plurality of salt groups are present in the amide molecule, these salt groups may be the same or different. For example, one salt group in the molecule may be a halide and another a sulfate. In this way it is possible to obtain a heat-convertible resin of self-curing characteristics and other properties best adapted to meet a particular molding problem and service application of the finished article.

In certain cases, it may be advantageous to use a single amino salt with a plurality of urea substances. Thus to modify the characteristics of the molded product I may use a mixture of, for example, a thiourea and a triazine derivative, or urea and dicyandiamide, with a single aminosalt. In other cases, instead of using a single amino salt, I may use a plurality of amino salts with a single urea substance or with a plurality of urea substances.

The ratio of the reactants to each other may be considerably varied but, in general, it is desirable to use at least one mole of an aliphatic aldehyde for each mole of mixed (total) urea and amino salt. In producing the heat-convertible resinous condensation products of this invention, the proportion of amino salt in all cases is at least sufficient to impart self-curing characteristics to the resin. Ordinarily not exceeding substantially ¼ mole amino salt is used for each mole of urea substance. No advantage accrues from using an amount of amino salt above the minimum required to secure the desired curing rate. Further, the use of higher amounts of amino salt is undesirable for most molding applications because of the highly accelerated cure and because of the decrease in water resistance when large amounts of low molecular weight amino salts are used. In some cases, particularly where high molecular weight amino salts, as for example, alpha amino-stearamide hydrochloride, are used, the aminoamide salt portion of the resin molecule exceeds on a weight basis the urea portion of the molecule. Consequently, in such cases the inherent characteristics (for example, waxy nature) of the high molecular weight amino compound predominate in the resin molecule. This may be objectionable in some applications of the molded part, for instance where resistance to the ordinary organic solvents is required.

From the foregoing it will be seen that the particular mole ratio of amino salt to the other components is dependent somewhat upon the inherent characteristics of the amino salt and the curing characteristics and other properties desired in the heat-convertible and heat-hardened resinous condensation products. For molding applications the ratio of the aliphatic aldehyde to urea substance may be considerably varied, but generally will be within the range of 1½ to 2½ moles aliphatic aldehyde for each mole of urea substance. No particular advantage ordinarily accrues from the use of higher amounts of aldehyde. Approximately 2 moles aliphatic aldehyde per mole urea substance usually gives very satisfactory results, particularly from the viewpoint of optimum yields of condensation products per unit cost.

The fundamental resins of this invention may be varied widely by introducing other modifying bodies before, during or after effecting condensation between the primary components. Thus, as modifying agents I may use, for example, monohydric alcohols such as ethyl, propyl, isopropyl, butyl, amyl, etc., alcohols; polyhydric alcohols such as ethylene glycol, diethylene glycol, glycerine, pentaerythritol, trimethylol nitro methane, etc.; monoamides such as formamide, acetamide, stearamide, acrylamide, benzamide, toluene sulfonamide, etc.; polyamides such as adipic diamide, phthalamide and the like; amines such as ethylene diamine, aniline, phenylene diamine, amino phenols, etc.

The modifying bodies also may take the form of high molecular weight bodies, with or without resinous characteristics, for example partially hydrolyzed wood products, lignin, proteins, furfural condensation products, protein-aldehyde condensation products, phenol-aldehyde condensation products, aniline-aldehyde condensation products, modified or unmodified, saturated or unsaturated polybasic acid-polyhydric alcohol condensation products, sulfonamide-aldehyde resins, water-soluble cellulose derivatives, natural gums and resins such as copal, shellac, rosin, etc., polyvinyl compounds such as polyvinyl alcohol, polyvinyl acetate, polyvinyl acetals, specifically polyvinyl formal, synthetic linear condensation products such as the superpolyamides, etc.

Other modifying agents of a plasticizing or softening nature also may be incorporated with the condensation products of this invention. Examples of such modifying agents are the phthalate esters, for instance dimethyl phthalate, diethyl phthalate, dibutyl phthalate, etc., the phosphate esters such as tricresyl phosphate, triphenyl phosphate, etc.

Dyes, pigments and opacifiers (e. g., barium sulfate, zinc sulfide, titanium compounds such as the oxides, flaked aluminum, copper and the like) may be incorporated into the compositions to alter the visual appearance and optical properties of the finished product. Mold lubricants such as the metallic soaps of the high molecular weight fatty acids, for example the stearates and palmitates of tin, zinc, etc., waxes such as carnauba, high melting point paraffin waxes, etc., may be added to facilitate molding of the compositions. Various fillers may be used to provide a wide variety of molding compositions. The choice of the filler depends upon the particular application for which the molded article is to be used. As fillers may be used, for instance, bleached or unbleached wood flour, alpha cellulose in flock form, sheets or cuttings of paper, cloth, canvas, etc., asbestos in powdered or long or short fiber length, powdered or flaked mica, wood chips, short or long wood fibers, synthetic or natural continuous threaded fibers, glass fibers in continuous filament or fabric (woven or felted) form, etc.

In the preparation of molding compositions from the resinous bodies of this invention, the non-dehydrated or the partially dehydrated resins may be compounded with the above addition agents in accordance with procedures well known to those skilled in the plastics art. The wet composition may be dried in the usual manner either at normal (room) temperature or at elevated temperatures in a preheated stream of air or under the influence of reflected heat energy. The dried compound may be densified through the usual processes of working in a Banbury mixer, or by rolling, pelleting or other means, followed by grinding and screening to the desired particle size. These molding compositions may be molded at elevated temperatures, preferably between 100° and 150° C., and at suitable pressures. The molding pressures generally range between about 1000 and about 4000 pounds per square inch, more particularly from about 2000 to 3000 pounds per square inch.

In addition to their use in molding compositions, the condensation products of this invention are especially suitable for use as fire retardants, water repellents and sizings when applied to wood or the like, or to fibrous materials such as silk, cotton, wool, synthetic organic fibers, etc., in continuous filament, thread, fabric, or other form. It will be understood, of course, that optimum resistance to water, fire, solvents, etc., is obtained only when the applied coating or sizing is converted to the insoluble infusible (cured) state. The cellulosic or other fibrous materials to be treated may be surface coated or both coated and impregnated by any suitable means, for example by spraying with, or immersing in, a solution of the treating agent and thereafter removing the solvent.

The modified and unmodified products of this invention have a wide variety of other uses, for instance in making buttons, clock cases, radio cabinets, dishes, and other household utensils, decorative novelties and various other cast, molded and laminated articles of manufacture. They may be used in making arc-extinguishing tubes capable of evolving an arc-extinguishing gas under the heat of the arc, in the production of wire or baking enamels, and for bonding or cementing together mica flakes to form a laminated mica article. They also may be used in making laminated fibrous sheet materials wherein superposed layers of cloth, paper, etc., are firmly bonded together with the resin, as impregnants for electrical coils and other electrical devices, and for other purposes.

What I claim as new and desire to secure by Letters Patent of the United States is:

1. A composition containing the resinous product obtained by reaction of ingredients including (1) a urea, (2) an aliphatic aldehyde and (3) an aldehyde-reactable salt selected from the class consisting of addition salts of an acid and an amino compound selected from the following: (a) monomeric amino aliphatic carboxylic amides wherein each and every carbon atom connected to the nitrogen atom of the amino group other than the amino group of the amide radical always has at least one hydrogen atom attached thereto, (b) monomeric amino aromatic carboxylic amides, (c) monomeric amino sulfonamides and (d) monomeric amino nitriles, the said amino group in the compounds of (a), (b), (c) and (d) in all cases having at least one hydrogen atom attached to the nitrogen atom thereof.

2. A composition containing an alcohol-modified condensation product of (1) a urea, (2) an aliphatic aldehyde and (3) an aldehyde-reactable salt selected from the class consisting of addition salts of an acid and an amino compound selected from the following: (a) monomeric amino aliphatic carboxylic amides wherein each and every carbon atom connected to the nitrogen atom of the amino group other than the amino group of the amide radical always has at least one hydrogen atom attached thereto, (b) monomeric amino aromatic carboxylic amides, (c) monomeric amino sulfonamides and (d) monomeric amino nitriles, the said amino group in the compounds of (a), (b), (c) and (d) in all cases having at least one hydrogen atom attached to the nitrogen atom thereof.

3. A heat-curable resinous condensation product of ingredients comprising a urea, formaldehyde and a small amount of an aldehyde-reactable salt selected from the class consisting of addition salts of an acid and an amino compound selected from the following: (a) monomeric amino aliphatic carboxylic amides wherein each and every carbon atom connected to the nitrogen atom of the amino group other than the amino group of the amide radical always has at least one hydrogen atom attached thereto, (b) monomeric amino aromatic carboxylic amides, (c) monomeric amino sulfonamides and (d) monomeric amino nitriles, the said amino group in the compounds of (a), (b), (c) and (d) in all cases having at least one hydrogen atom attached to the nitrogen atom thereof.

4. A heat-curable composition containing the heat-convertible resinous condensation product of ingredients including the following components in the stated molar ratios: (1) 1 mole of a urea, (2) at least 1 mole of formaldehyde and (3) not exceeding substantially $\frac{1}{4}$ mole of an aldehyde-reactable salt selected from the class consisting of addition salts of an acid and an amino compound selected from the following: (a) monomeric amino aliphatic carboxylic amides wherein each and every carbon atom connected to the nitrogen atom of the amino group other than the amino group of the amide radical always has at least one hydrogen atom attached thereto, (b) monomeric amino aromatic carboxylic amides, (c) monomeric amino sulfonamides and (d) monomeric amino nitriles, the said amino group in the compounds of (a), (b), (c) and (d) in all cases having at least one hydrogen atom attached to the nitrogen atom thereof.

5. A product comprising the cured resinous condensation product of claim 3.

6. A condensation product of ingredients including (1) a urea, (2) an aliphatic aldehyde and (3) an aldehyde-reactable addition salt of an acid and a monomeric amino aliphatic carboxylic amide wherein each and every carbon atom connected to the nitrogen atom of the amino group other than the amino group of the amide radical always has at least one hydrogen atom attached thereto and the said amino group in all cases has at least one hydrogen atom attached to the nitrogen atom thereof.

7. A molding composition containing a heat-hardenable resinous condensation product of ingredients including (1) urea, (2) formaldehyde and (3) an aldehyde-reactable addition salt of an organic acid and a monomeric amino aliphatic carboxylic amide wherein each and every carbon atom connected to the nitrogen atom of the amino group other than the amino group of the amide radical always has at least one hydrogen atom attached thereto and the said amino group in all cases has at least one hydrogen atom attached to the nitrogen atom thereof.

8. A molding composition containing a heat-hardenable resinous condensation product of ingredients including (1) urea, (2) formaldehyde and (3) an aldehyde-reactable addition salt of an inorganic acid and a monomeric amino aliphatic carboxylic amide wherein each and every carbon atom connected to the nitrogen atom of the amino group other than the amino group of the amide radical always has at least one hydrogen atom attached thereto and the said amino group in all cases has at least one hydrogen atom attached to the nitrogen atom thereof.

9. A molding composition comprising a filler and a soluble, fusible resinous condensation product of ingredients comprising the following components in the stated molar ratios: 1 mole urea, at least 1 mole formaldehyde and not exceeding substantially $\frac{1}{4}$ mole of aminoacetamide hydrochloride.

10. A molding composition comprising a filler and a soluble fusible resinous condensation product of ingredients comprising the following components in the stated molar ratios: 1 mole urea, at least 1 mole formaldehyde and not exceeding substantially $\frac{1}{4}$ mole of aminoacetonitrile hydrochloride.

11. An article of manufacture comprising the heat- and pressure-hardened molding composition of claim 7.

12. A product comprising the cured composition of claim 4.

13. The method of preparing new synthetic compositions which comprises effecting reaction under heat between ingredients including the following components in the stated molar ratios: (1) 1 mole of a urea, (2) at least 1 mole of an aliphatic aldehyde and (3) not exceeding substantially $\frac{1}{4}$ mole of an aldehyde-reactable salt selected from the class consisting of addition salts of an acid and an amino compound selected from the following: (a) monomeric amino aliphatic carboxylic amides wherein each and every carbon atom connected to the nitrogen atom of the amino group other than the amino group of the amide radical always has at least one hydrogen atom attached thereto, (b) monomeric amino aromatic carboxylic amides, (c) monomeric amino sulfonamides and (d) monomeric amino nitriles, the said amino group in the compounds of (a), (b), (c) and (d) in all cases having at least one hydrogen atom attached to the nitrogen atom thereof.

14. A condensation product of ingredients including (1) a urea, (2) an aliphatic aldehyde and (3) an aldehyde-reactable addition salt of an acid and a monomeric amino nitrile, the amino group of which has at least one hydrogen atom attached to the amino nitrogen.

15. A molding composition containing a heat-hardenable resinous condensation product of ingredients including (1) urea, (2) formaldehyde and (3) an aldehyde-reactable addition salt of an inorganic acid and a monomeric amino nitrile, the amino group of which has at least one hydrogen atom attached to the amino nitrogen.

16. A composition of matter comprising the product of reaction of (1) a partial condensation product of ingredients including urea and formaldehyde and (2) an aldehyde-reactable salt selected from the class consisting of addition salts of an acid and an amino compound selected from the following: (a) monomeric amino aliphatic carboxylic amides wherein each and every carbon atom connected to the nitrogen atom of the amino group other than the amino group of the amide radical always has at least one hydrogen atom attached thereto, (b) monomeric amino aromatic carboxylic amides, (c) monomeric amino sulfonamides and (d) monomeric amino nitriles, the said amino group in the compounds of (a), (b), (c) and (d) in all cases having at least one hydrogen atom attached to the nitrogen atom thereof.

17. A resinous composition comprising the product of reaction of (1) a partial condensation product of ingredients comprising urea and formaldehyde, and (2) an addition salt of aminoacetamide.

18. The method which comprises (1) preparing a partial condensation product of ingredients including a urea and an aliphatic aldehyde and (2) causing to react with the said partial condensation product an aldehyde-reactable salt selected from the class consisting of addition salts of an acid and an amino compound selected from the following: (a) monomeric amino aliphatic carboxylic amides wherein each and every carbon atom connected to the nitrogen atom of the amino group other than the amino group of the amide radical always has at least one hydrogen atom attached thereto, (b) monomeric amino aromatic carboxylic amides, (c) monomeric amino sulfonamides and (d) monomeric amino nitriles, the said amino group in the compounds of (a), (b), (c) and (d) in all cases having at least one hydrogen atom attached to the nitrogen atom thereof.

19. A composition containing the resinous product of reaction of (1) a partial condensation product of ingredients including a urea and an aliphatic aldehyde, and (2) an addition salt of aminoacetamide.

20. A composition containing the resinous product of reaction of (1) a partial condensation product of ingredients including a urea and an aliphatic aldehyde, and (2) an addition salt of aminoacetonitrile.

GAETANO F. D'ALELIO.